US012661996B2

(12) United States Patent
Åsbogård et al.

(10) Patent No.: US 12,661,996 B2
(45) Date of Patent: Jun. 23, 2026

(54) METHOD FOR CONTROLLING BRAKING OF VEHICLE

(71) Applicant: VOLVO TRUCK CORPORATION, Gothenburg (SE)

(72) Inventors: Mattias Åsbogård, Mölnlycke (SE); Mattias Andreasson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 89 days.

(21) Appl. No.: 18/471,582

(22) Filed: Sep. 21, 2023

(65) Prior Publication Data

US 2024/0100958 A1      Mar. 28, 2024

(30) Foreign Application Priority Data

Sep. 23, 2022     (SE) ..................................... 2251102-6

(51) Int. Cl.
B60L 7/26          (2006.01)

(52) U.S. Cl.
CPC ........... B60L 7/26 (2013.01); B60L 2240/423 (2013.01); B60L 2250/28 (2013.01)

(58) Field of Classification Search
CPC ........... B60L 2240/423; B60L 2250/26; B60L 2250/28; B60L 7/26; B60T 2220/04; B60T 7/042
See application file for complete search history.

(56) References Cited

U.S. PATENT DOCUMENTS

| | | | |
|---|---|---|---|
| 9,193,343 B2 | 11/2015 | Jung et al. | |
| 9,260,089 B2* | 2/2016 | Schuler | B60T 7/12 |
| 11,247,621 B2* | 2/2022 | Hwang | B60R 16/0231 |
| 2002/0020575 A1* | 2/2002 | DeLuca | B60T 17/18 |
| | | | 180/271 |
| 2008/0269998 A1 | 10/2008 | Shiiba et al. | |
| 2012/0173057 A1 | 7/2012 | Books | |

(Continued)

FOREIGN PATENT DOCUMENTS

| | | |
|---|---|---|
| DE | 19706451 A1 | 8/1998 |
| DE | 102005054614 A1 | 5/2007 |

(Continued)

OTHER PUBLICATIONS

Swedish Search Report in corresponding Swedish Application No. 2251102-6 mailed May 22, 2023 (3 pages).

(Continued)

*Primary Examiner* — Carl C Staubach
(74) *Attorney, Agent, or Firm* — Jeffri A. Kaminski; Venable LLP

(57)          ABSTRACT

A method includes i) receiving, by a processor device of a computer system, a signal corresponding to a release of an accelerator, ii) receiving, by the processor device, a signal corresponding to a first tap on a brake pedal, said first tap comprising an initiated physical interaction with the brake pedal and a subsequent release of the physical interaction with the brake pedal, iii) determining, by the processor device, a second braking torque, iv) applying the second braking torque as a response to the first tap on the brake pedal, and maintaining the applied braking torque after said tap on the brake pedal.

15 Claims, 5 Drawing Sheets

(56)                References Cited

U.S. PATENT DOCUMENTS

| | | | | |
|---|---|---|---|---|
| 2012/0310501 | A1* | 12/2012 | DeWitt | B60W 50/087 |
| | | | | 701/70 |
| 2013/0162009 | A1* | 6/2013 | Mitts | B60L 7/26 |
| | | | | 303/3 |
| 2014/0350814 | A1* | 11/2014 | Schuler | B60W 30/18127 |
| | | | | 701/70 |
| 2015/0222209 | A1* | 8/2015 | Crisp | B60W 30/18127 |
| | | | | 318/376 |
| 2018/0215272 | A1* | 8/2018 | Vitullo | B60L 7/18 |
| 2022/0097671 | A1* | 3/2022 | Bolger | B60W 10/04 |

FOREIGN PATENT DOCUMENTS

| | | | |
|---|---|---|---|
| DE | 102007039107 | A1 | 2/2009 |
| DE | 102010004846 | A1 | 3/2011 |
| DE | 102011011345 | A1 | 8/2012 |
| EP | 0860337 | A2 | 8/1998 |
| EP | 2902292 | A1 | 8/2015 |
| JP | 2020006717 | A | 1/2020 |
| JP | 6893493 | B2 | 6/2021 |
| WO | 2009099354 | A1 | 8/2009 |

OTHER PUBLICATIONS

Extended European Search Report dated Feb. 1, 2024 in corresponding European Patent Application No. 23198616.7, 8 pages.

* cited by examiner

METHOD FOR CONTROLLING BRAKING OF VEHICLE

TECHNICAL FIELD

The disclosure relates generally to vehicles. In particular aspects, the disclosure relates to a method for controlling braking of a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

With the developments of electric drivelines for vehicles, new concepts for assisting the driver are emerging. One such concept is called "one pedal drive", which means that the use of the accelerator does not only control the positive propulsion torque provided to the wheels. With this concept, when the driver is releasing the accelerator, a regenerative torque is applied which causes braking of the vehicle.

Different schemes for determining the regenerative torque have been suggested, but so far, all existing solutions are quite simple; meaning that the regenerative torque applied when the accelerator is released, is often non-satisfactory for optimal driving. There is thus a need for improved methods for controlling braking of a vehicle, especially by enabling improved adaptation while still requiring minimum driver input.

SUMMARY

According to a first aspect of the disclosure, a computer-implemented method is provided. The method comprises receiving, by a processor device of a computer system, a signal corresponding to a release of an accelerator. The method also comprises receiving, by the processor device, a signal corresponding to a first tap on a brake pedal, the first tap comprising an initiated physical interaction with the brake pedal and a subsequent release of the physical interaction with the brake pedal, and determining, by the processor device, a second braking torque. The method further comprises applying the second braking torque as a response to the first tap on the brake pedal, and maintaining the applied braking torque after said tap on the brake pedal. The first aspect of the disclosure may seek to improve the energy efficiency of an associated vehicle. A technical benefit may include more energy efficient braking of the vehicle, a more simple braking interface for the driver, as well as improved driver comfort during operation of the vehicle.

According to a second aspect of the disclosure, a computer system is provided. The computer system comprises a processor device configured to perform the method of the first aspect.

In some examples, the method further comprises determining, by the processor device, a first braking torque after release of the accelerator, and applying the first braking torque as a response to the release of the accelerator. A technical benefit may include a facilitated interface for the driver to correct a default braking torque.

In some examples, the requested braking torque is higher than the first braking torque. A technical benefit may include increased safety by the driver initiating a higher braking torque only by tapping the brake pedal.

In some examples, receiving a signal corresponding to a tap on the brake pedal further comprises determining an action on the brake pedal by a pressure within a predetermined pressure threshold interval and for a time period within a predetermined time threshold interval. A technical benefit may include a distinct definition of the required trigger signal for additional braking, i.e. the tap, both in space and time.

In some examples, the method further comprises determining, by the processor device, a vehicle speed being above a predetermined speed threshold before applying the requested braking torque. A technical benefit may include avoidance of unintentional or unnecessary increase in braking at low speed.

In some examples, the method further comprises: receiving, by the processor device, a signal corresponding to a second tap on the brake pedal, said second tap comprising an initiated physical interaction with the brake pedal and a subsequent release of the physical interaction with the brake pedal, determining, by the processor device, an updated braking torque, and updating the requested braking torque by applying the updated braking torque as a response to the second tap on the brake pedal. A technical benefit may include enabling a stepwise increase of the braking torque in a simplified manner.

In some examples, the method further comprises: receiving, by the processor device, a release signal, and releasing the requested braking torque as a response to said release signal. A technical benefit may include a maintained braking torque by a simple tap, and a facilitated process for releasing the requested braking torque.

In some examples, the method further comprises: releasing the first braking torque as a response to said release signal. A technical benefit may include a facilitated process for releasing also the first braking torque.

In some examples, the release signal corresponds to a depression of the accelerator. A technical benefit may include a simplified interface for the driver to abort the braking by pressing the accelerator.

In some examples, the release signal corresponds to determining a vehicle speed being below a predetermined speed threshold. A technical benefit may include an automatic abortion of the braking when the speed is sufficiently low.

In some examples, the requested braking torque and/or the first braking torque is a regenerative torque. A technical benefit may include that existing electric motors can be used for braking, and that the regenerative motion can be used to charge onboard batteries.

According to a second aspect of the disclosure, a vehicle is provided. The vehicle comprises the processor device to perform the method of the first aspect.

According to a third aspect of the disclosure, a computer program product is provided. The computer program product comprises code for performing, when executed by the processor device, the method of the first aspect.

According to a fourth aspect, a control system is provided. The control system comprises one or more control units configured to perform the method of the first aspect.

According to fifth aspect, a non-transitory computer-readable storage medium is provided. The non-transitory computer-readable storage medium comprises instructions, which when executed by the processor device, cause the processor device to perform the method of the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

In general, a method is described which is aimed to improve energy efficiency of vehicles. In addition, the described method may provide a more simple interface for controlling driving, especially with regards to manually affecting automatic braking of the vehicle.

Figure 1:
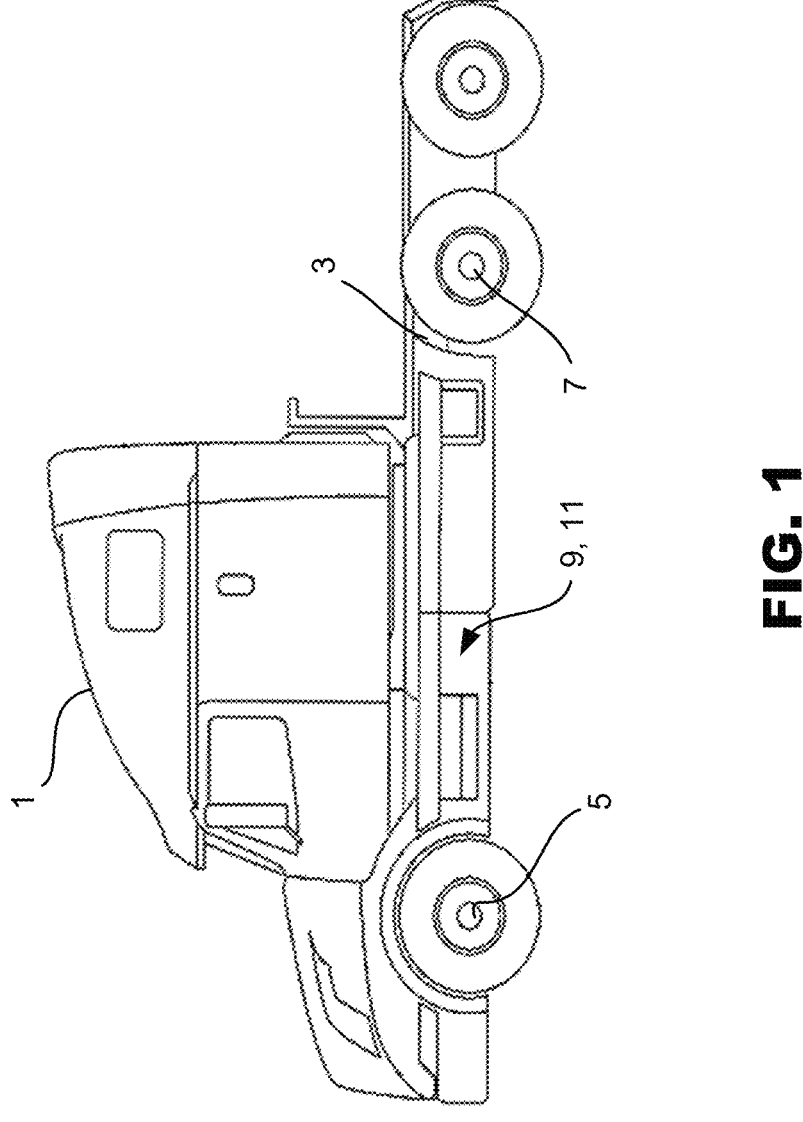
FIG. 1 is an exemplary side view of a vehicle according to one example.

FIG. 1 is an exemplary side view of a vehicle 1 according to one example. The vehicle 1, in FIG. 1 represented as a truck, comprises ordinary components as are well known in the art, such as a chassis 3, a plurality of wheel axles 5, 7, a propulsion unit 9 and an associated driveline 11. Preferably, the vehicle 1 is an electric vehicle which means that the propulsion unit 9 comprises one or more electrical motors with associated equipment such as batteries, power electronics, etc.

Although the vehicle 1 is illustrated as a truck, it should be realized that other types of vehicles may be equally considered for the purpose of the herein described method such as busses, construction equipment, passenger cars, etc.

Figure 2:
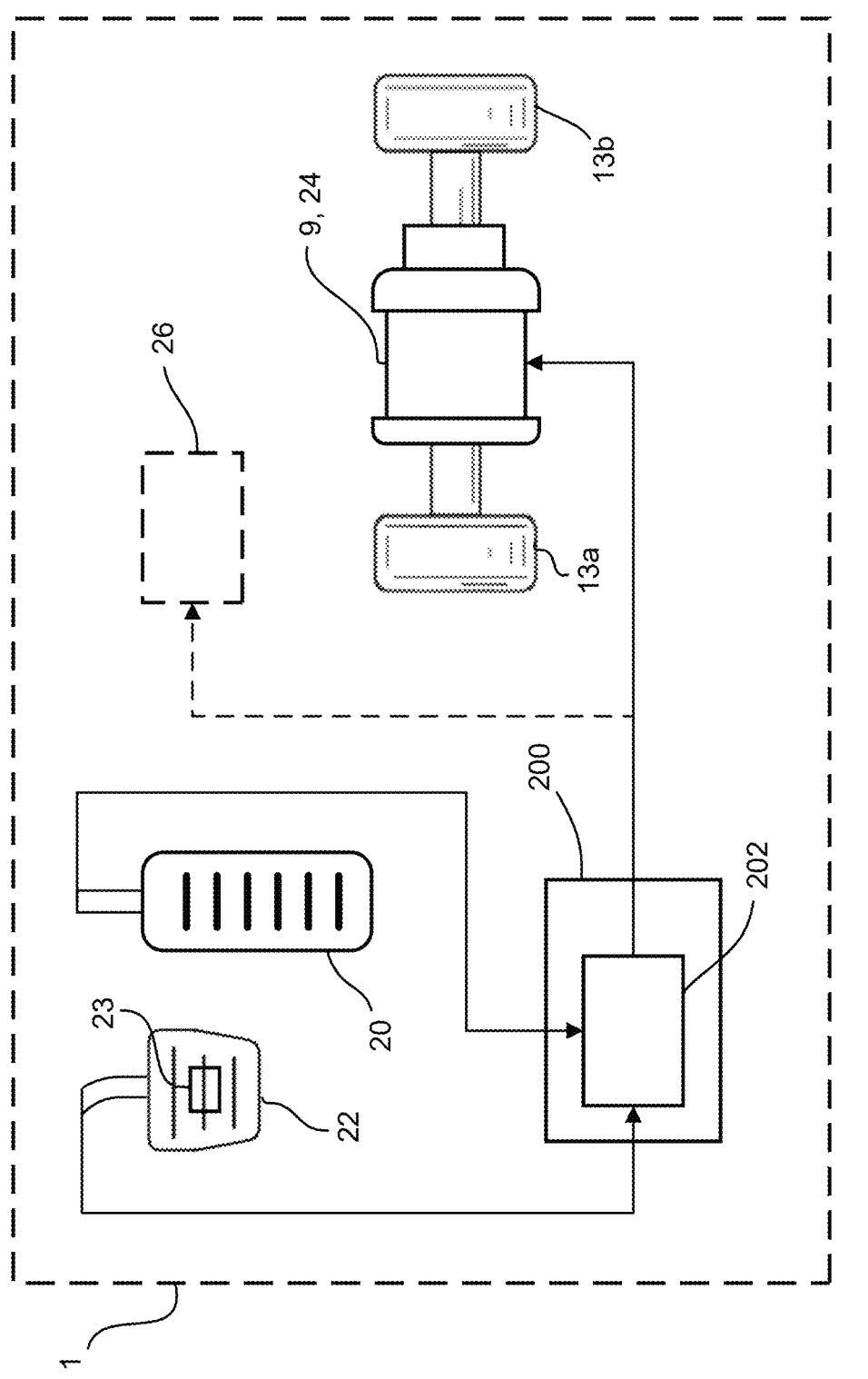
FIG. 2 is an exemplary schematic view of parts of a vehicle according to one example.

In FIG. 2 further details of the vehicle 1 are shown, exemplifying components used for implementing the method described further below.

An accelerator 20, in the form of a pedal, is used by the driver to control propulsion of the vehicle 1. A brake pedal 22 is further provided which is used by the driver to control braking of the wheels 13a, 13b of the vehicle 1.

A computer system 200 is further provided. The computer system 200 comprises a processor device 202, e.g. a control unit, which is in communication with the accelerator 20 and the brake pedal 22. The processor device 202 is further in communication with a brake device 24, 26. In the shown example, the brake device 24 is preferably an electric propulsion unit 9 (in FIG. 2 illustrated as an electric motor with associated control circuitry); for braking, the electric propulsion unit 24 is configured to provide a regenerative torque to the vehicle 1. Optionally, or in combination with the electric propulsion unit 24, the vehicle 1 comprises a brake device 26 in the form of a retarder, such as an electrical or hydraulic retarder.

The computer system 200 is configured to enable so called "one pedal drive". This means the computer system 200 is configured to implement an automatic braking action on the vehicle 1 immediately when the driver releases the accelerator 20. Such braking action is normally not effected by actuation of wheel brakes, but rather by activating a retardation for example by means of the retarder 26, or by applying a regenerative torque by the electric propulsion unit 9.

According to the present example, the computer system 200 is further configured to allow the driver to manually interact with the automatic braking procedure applied when releasing the accelerator 20. This is done by the driver tapping the brake pedal 22. Such tapping will be identified by the computer system 200, e.g. by receiving a signal from a contact sensor 23 arranged on the brake pedal 22, and a control signal will be transmitted to increase the braking torque. Typically, the tapping on the brake pedal 22 will not actuate the wheel brakes, but instead the braking torque already applied by the brake device 24, 26 (may it be a separate retarder 24 and/or a regenerative torque from the electric propulsion unit 9).

Figure 3:
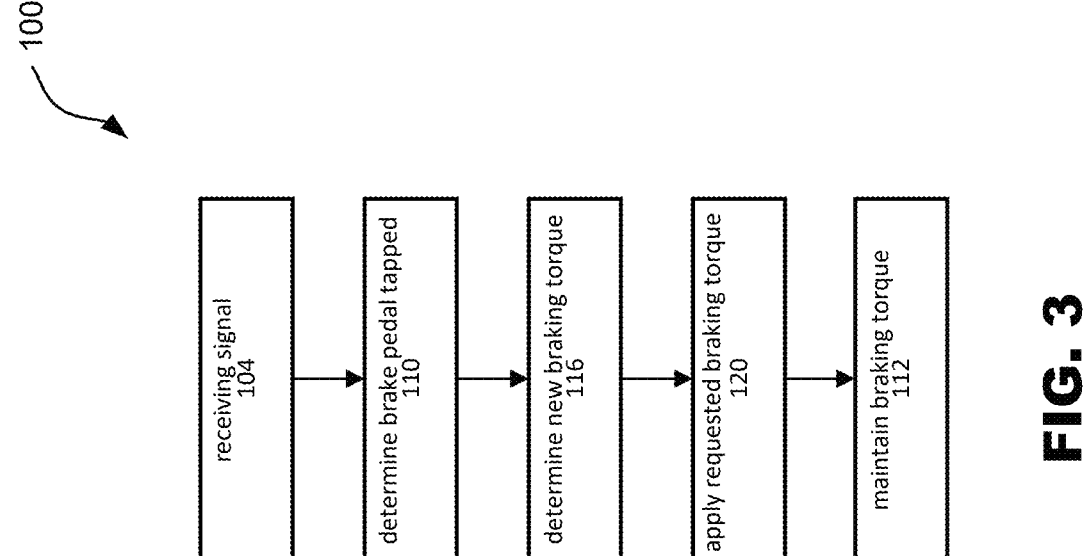
FIG. 3 is an exemplary schematic view of a method according to one example.

In FIG. 3 a general diagram of a method 100 according to an example is shown. The method 100 is performed by the computer system 200 receiving 104 a signal indicative of a driver's release of the accelerator 20. Next, the method 100 determines 110 that the brake pedal 22 is tapped by the driver. When the brake pedal 22 is tapped, the method determines 116 a new requested braking torque. When the requested braking torque is determined, the method applies 120 the requested braking torque to the vehicle 1 and maintains 112 the applied braking torque after the brake pedal 22 has been tapped.

Figure 4:
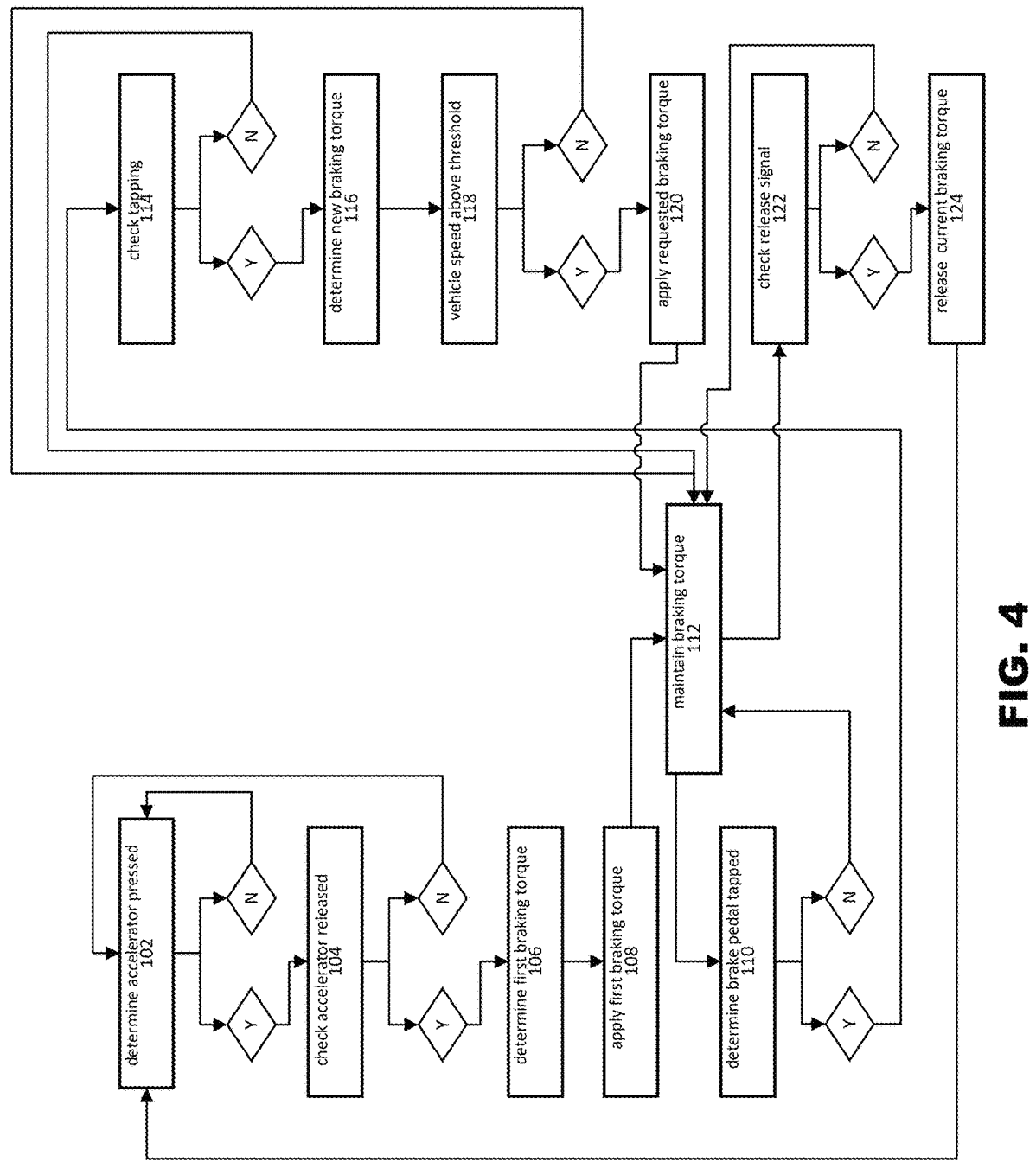
FIG. 4 is an exemplary schematic view of a method according to a further example.

In order to further explain various examples of the method 100, reference is made to FIG. 4. The method 100 may preferably be implemented as a continuous control loop executed during driving of the vehicle 1, as explained in the following.

At first, the method 100 determines 102 if the accelerator 22 is pressed (e.g. actuated), indicating that the driver is requesting propulsion of the vehicle 1. If not, the method 100 returns for again checking if the accelerator 20 is actuated.

If it is determined that the accelerator 20 is pressed, the method 100 checks 104 if the accelerator 20 is released. This corresponds to the computer system 200 receiving a signal indicative of a driver's release of the accelerator 20. If not, the method 100 may return to the initial state 102.

If it is determined that the accelerator 20 is released, the method 100 determines 106 a first braking torque. The first braking torque is preferably automatically determined based on a plurality of parameters, such as vehicle speed, road inclination, etc. If the brake device 24 is a regenerative brake device 9, also parameters like temperature and current charging level of onboard batteries may be considered.

Once the first braking torque is determined, the method 100 continues by applying 108 the determined first braking torque to the vehicle 1. This will cause a retardation of the vehicle 1.

When it is determined to apply 108 a braking torque to the vehicle, the method 100 continues maintaining 112 the applied braking torque.

If the driver for some reason considers that the applied braking torque, experienced mainly by the resulting retardation of the vehicle 1, is too low, the driver may tap the brake pedal 22. Hence, during retardation caused by the applied first braking torque, the method 100 performs 110 a check if the brake pedal 22 is tapped by the driver. If not, the method 100 maintains 112 the current braking torque, i.e. the first braking torque.

It should be noted that the first braking torque does not need to be constant, but the determined first braking torque may be a dynamically changing braking torque based on any one or more of the plurality of driving parameters mentioned above. For example, the first braking torque may be a decaying function of vehicle speed (or any other suitable parameter), meaning that the first braking torque will decrease as the vehicle 1 retards. In other examples the first braking torque may be a progressive function of vehicle speed (or any other suitable parameter), meaning that the first braking torque will increase as the vehicle 1 retards. The first braking torque may in some examples be zero, meaning that the once the driver releases the accelerator 20, the vehicle is rolling free.

If it is decided that the driver has tapped the brake pedal 22, the method 100 performs 114 a check if the tapping is within predetermined tapping criteria. This is preferably performed in order to accurately distinguish a tap from a regular braking command, which normally involves distinct pressing of the brake pedal 22. Hence, tapping is determined as being distinct from a normal pressing for actuating the wheel brakes. Typically, the tap comprises an initiated physical interaction with the brake pedal 22 and a subsequent release of the physical interaction with the brake pedal 22.

A tap may be determined based on parameters such as pressure, time, and/or brake pedal 22 angle. For example, a tap is determined if the pressure is within a certain pressure interval (preferably being significantly less than required for normal braking using the wheel brakes) and/or within a certain time period (preferably being significantly less than required for normal braking using the wheel brakes). Further, a tap may be determined if there is a limited physical interaction with the brake pedal 22, but the brake pedal 22 angle is zero, i.e. there is no physical movement of the brake pedal 22.

Existing or dedicated sensors may be used to determine if the brake pedal 22 is tapped within the context of this example. The brake pedal 22 may e.g. be provided with a contact sensor 23 which is capable of detecting a physical interaction with the brake pedal 22, as well as the time period for such physical interaction. If a separate brake pedal 22 angle sensor is provided for actuating the wheel brakes, a tap may be determined if the contact sensor 23 generates a signal indicative of the driver interacting with it, while at the same time the brake pedal 22 angle sensor is "silent", i.e. provides no actuation signal.

If the physical interaction is decided to fall outside the criteria for a valid tap, the method 100 continues by maintaining 112 the already applied braking torque.

On the other hand, if the check 114 for a valid tap is positive, the driver is requesting a change of the current braking torque. In such case, the method 100 continues by determining 116 a new, requested braking torque. The requested braking torque may be determined by various schemes. For example, the method 100 may determine that a tap should correspond to a predetermined increase of the braking torque, such as by a fixed amount or by a fixed percentage. The method 100 may, as an example, determine that a valid tap on the brake pedal 22 should increase the first braking torque by 10% or by a fixed amount such as 200 Nm. In other examples, the requested braking torque is determined based on one or more of a plurality of operation parameters such as such as vehicle speed, road inclination, the current braking torque, etc. Even if the first braking torque is zero, or a function of e.g. vehicle speed, the requested braking torque may be determined as an add-on to the first braking torque.

Either prior to or after the requested braking torque is determined 116, the method 100 determines 118 if the current vehicle speed is above a predetermined threshold. By such check, the method 100 provides a safety measure not to increase the braking torque at too low speeds. If the current vehicle speed is below the threshold, which may be set to e.g. 25 km/h, the method 100 continues to maintain 112 the current braking torque meaning that the tap by the driver will have no effect to the retardation.

If the current vehicle speed is above the threshold, the determined requested braking torque is applied 120 to the vehicle 1. When it is determined to apply 120 the requested braking torque to the vehicle 1, the method 100 continues maintaining 112 the applied braking torque.

At this stage 112, the method 100 performs recurring checks 110 if the brake pedal 22 is once again tapped, which would trigger the same sequence 112-120 as previously explained. Hence, a driver may tap the brake pedal 22 a first time to initiate a first update of the braking torque, and subsequent taps on the brake pedal 22 to initiate further updates of the braking torque, whereby each tap on the brake pedal 22 will cause a corresponding change of the braking torque.

Simultaneously, the method 100 performs a check 122 for a release signal. A release signal may for example correspond to a signal indicative of the driver again pressing the accelerator 20. A release signal may also be generated if the vehicle speed decreases below a predetermined threshold. If no release signal is detected, the method 100 continues by returning to maintaining 112 the current braking torque.

If a release signal is issued, the method continues by releasing 124 the current braking torque. Upon such action, the method 100 returns to the initial stage 102 of checking 102 if the accelerator 20 is pressed.

The method 100 may further comprise processes for determining different tap schemes, and to apply a requested braking torque based on the different tap schemes. In one example, a single tap on the brake pedal 22 involves the same procedures as described above. The processor device 202 may be configured to associate other tap patterns, such as a fast double tap, with different braking torque requests. For example, a driver performing a double tap may cause the method 100 to apply an increased braking torque compared to a single tap. In other examples a double tap, performed after the first tap, may cause the method 100 to release the requested braking torque and return to the previously applied first braking torque.

Figure 5:
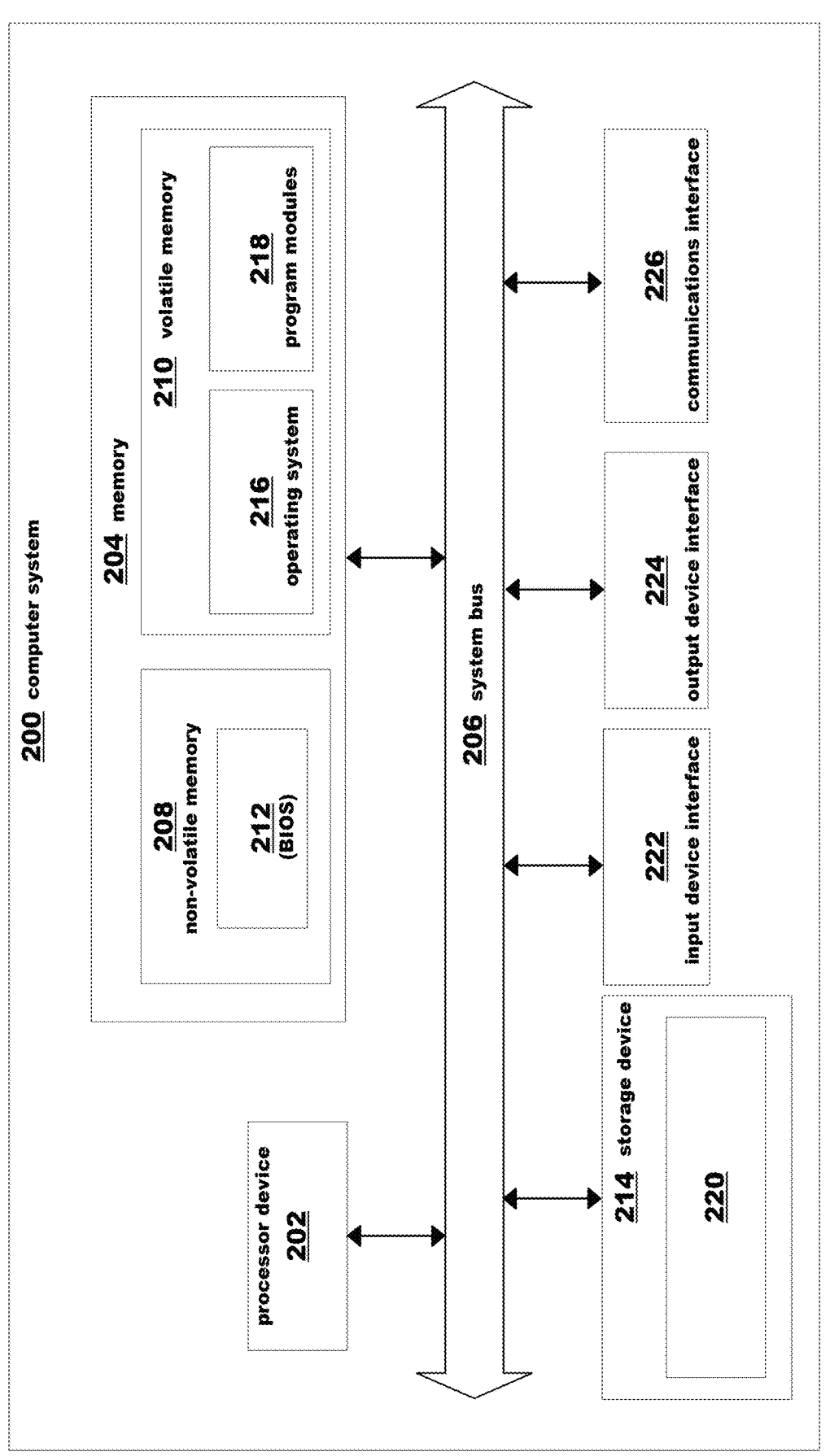
FIG. 5 is a schematic diagram of an exemplary computer system for implementing examples disclosed herein, according to one example.

FIG. 5 is a schematic diagram of a computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN, an intranet, an extranet, or the Internet. While only a single device is illustrated, the computer system 200 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 200 may comprise at least one computing device or electronic device capable of including firmware, hardware, and/or executing software instructions to implement the functionality described herein. The computer system 200 may include a processor device 202 (may also be referred to as a control unit), a memory 204, and a system bus 206. The computer system 200 may include at least one computing device having the processor device 202. The system bus 206 provides an interface for system components including, but not limited to, the memory 204 and the processor device 202. The processor device 202 may include any number of hardware components for conducting data or signal processing or for executing computer code stored in memory 204. The processor device 202 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 206 may be any of several types of bus structures that may further interconnect to a memory bus (with or without a memory controller), a peripheral bus, and/or a local bus using any of a variety of bus architectures. The memory 204 may be one or more devices for storing data and/or computer code for completing or facilitating methods described herein. The memory 204 may include database components, object code components, script components, or other types of information structure for supporting the various activities herein. Any distributed or local memory device may be utilized with the systems and methods of this description. The memory 204 may be communicably connected to the processor device 202 (e.g., via a circuit or any other wired, wireless, or network connection) and may include computer code for executing one or more processes described herein. The memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)), or any other medium which can be used to carry or store desired program code in the form of machine-executable instructions or data structures and which can be accessed by a computer or other machine with a processor device 202. A basic input/output system (BIOS) 212 may be stored in the non-volatile memory 208 and can include the basic routines that help to transfer information between elements within the computer system 200.

The computer system 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 214 and/or in the volatile memory 210, which may include an operating system 216 and/or one or more program modules 218. All or a portion of the examples disclosed herein may be implemented as a computer program product 220 stored on a transitory or non-transitory computer-usable or computer-readable storage medium (e.g., single medium or multiple media), such as the storage device 214, which includes complex programming instructions (e.g., complex computer-readable program code) to cause the processor device 202 to carry out the steps described herein. Thus, the computer-readable program code can comprise software instructions for implementing the functionality of the examples described herein when executed by the processor device 202. The processor device 202 may serve as a controller or control system for the computer system 200 that is to implement the functionality described herein.

The computer system 200 also may include an input device interface 222 (e.g., input device interface and/or output device interface). The input device interface 222 may be configured to receive input and selections to be communicated to the computer system 200 when executing instructions, such as from a keyboard, mouse, touch-sensitive surface, etc. Such input devices may be connected to the processor device 202 through the input device interface 222 coupled to the system bus 206 but can be connected through other interfaces such as a parallel port, an Institute of Electrical and Electronic Engineers (IEEE) 1394 serial port, a Universal Serial Bus (USB) port, an IR interface, and the like. The computer system 200 may include an output device interface 224 configured to forward output, such as to a display, a video display unit (e.g., a liquid crystal display (LCD) or a cathode ray tube (CRT)). The computer system 200 may also include a communications interface 226 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method, comprising:
receiving, by a processor device of a computer system, a signal corresponding to a release of an accelerator,
receiving, by the processor device, a signal corresponding to a first tap on a brake pedal, said first tap comprising an initiated physical interaction with the brake pedal and a subsequent release of the physical interaction with the brake pedal,
determining, by the processor device, a requested braking torque, resulting in a predetermined requested braking torque,
applying the predetermined requested braking torque as a response to the first tap on the brake pedal, maintaining the applied braking torque after said tap on the brake pedal,
receiving, by the processor device, a signal corresponding to a second tap on the brake pedal, said second tap comprising an initiated physical interaction with the brake pedal and a subsequent release of the physical interaction with the brake pedal,
determining, by the processor device, an updated braking torque being a non-zero torque, and
updating the predetermined requested braking torque by applying the updated braking torque as a response to the second tap on the brake pedal.

2. A computer system comprising a processor device configured to perform the method of claim 1.

3. The method according to claim 1, further comprising:
determining, by the processor device, a first braking torque after release of the accelerator, and
applying the first braking torque as a response to the release of the accelerator.

4. The method of claim 3, wherein the predetermined requested braking torque is higher than the first braking torque.

5. The method of claim 1, wherein receiving a signal corresponding to a tap on the brake pedal further comprises:
determining an action on the brake pedal by a pressure within a predetermined pressure threshold interval and/or for a time period within a predetermined time threshold interval.

6. The method of claim 1, further comprising:
determining, by the processor device, a vehicle speed being above a predetermined speed threshold before applying the predetermined requested braking torque.

7. The method of claim 1, further comprising:
receiving, by the processor device, a release signal, and
releasing the predetermined requested braking torque as a response to said release signal.

8. The method of claim 3, further comprising:
receiving, by the processing device, a release signal, and
releasing the first braking torque as a response to said release signal.

9. The method of claim 7, wherein:
the release signal corresponds to a depression of the accelerator.

10. The method of claim 7, wherein:
the release signal corresponds to determining a vehicle speed being below a predetermined speed threshold.

11. The method of claim 1, wherein the predetermined requested braking torque is a regenerative torque.

12. The method of claim 3, wherein the first braking torque is a regenerative torque.

13. A vehicle comprising a processor device configured to perform the method of claim 1.

14. A control system comprising one or more control units configured to perform the method according to claim 1.

15. A non-transitory computer-readable storage medium comprising instructions, which when executed by the processor device, cause the processor device to perform the method of claim 1.

* * * * *